US008706316B1

(12) United States Patent
Hoevenaar

(10) Patent No.: US 8,706,316 B1
(45) Date of Patent: Apr. 22, 2014

(54) METHOD AND SYSTEM FOR ENHANCED SCANNER USER INTERFACE

(75) Inventor: Robert Hoevenaar, Mundelein, IL (US)

(73) Assignee: Snap-On Incorporated, Kenosha, WI (US)

( * ) Notice: Subject to any disclaimer, the term of this patent is extended or adjusted under 35 U.S.C. 154(b) by 1829 days.

(21) Appl. No.: 11/374,466

(22) Filed: Mar. 14, 2006

(51) Int. Cl.
*G06F 3/00* (2006.01)

(52) U.S. Cl.
USPC .............................................. 701/1; 340/438

(58) Field of Classification Search
USPC .................. 701/29–32, 34, 35, 32.2, 32.7, 1; 702/34, 182; 340/438
See application file for complete search history.

(56) References Cited

U.S. PATENT DOCUMENTS

| | | | | |
|---|---|---|---|---|
| 5,774,361 | A | 6/1998 | Colarelli, III et al. | |
| 6,732,031 | B1 * | 5/2004 | Lightner et al. | 701/33 |
| 7,523,159 | B1 * | 4/2009 | Williams et al. | 709/203 |
| 2005/0080593 | A1 | 4/2005 | Blaser | |
| 2007/0208464 | A1 * | 9/2007 | Moorhead | 701/1 |

FOREIGN PATENT DOCUMENTS

| | | | |
|---|---|---|---|
| DE | 100 21 533 | C1 | 4/2002 |
| EP | 1 229 475 | A2 | 1/2002 |
| WO | WO 00/16057 | | 3/2000 |

OTHER PUBLICATIONS

International Search Report and Written Opinion of the International Searching Authority, issued in corresponding International Patent Application No. PCT/US2007/004766, dated on Aug. 20, 2007.

* cited by examiner

*Primary Examiner* — Dalena Tran
(74) *Attorney, Agent, or Firm* — McDermott Will & Emery LLP

(57) ABSTRACT

A method and system for presenting vehicle information. A functional part of a vehicle is selected to be examined and information related to the selected function part is received. A vehicle model corresponding to the vehicle is retrieved. Based on the selected functional part and the vehicle model, a mode of operation is determined and used in presenting the vehicle model and the information so that a portion of the model corresponding to the functional part is visible and the information is presented with respect to the visible functional part of the presented model.

31 Claims, 11 Drawing Sheets

METHOD AND SYSTEM FOR ENHANCED SCANNER USER INTERFACE

TECHNICAL FIELD

The disclosure relates generally to automotive systems. More specifically, the disclosure relates to method and system for vehicle diagnosis.

BACKGROUND ART

In current vehicle diagnosis, a user often uses a scanner to read out information related to a vehicle system via one or more electronic control units (ECUs) in the vehicle. The scanner then presents such information to the user in one or more lists. Frequently, the user has to sort out as to which parameter in a list shows what type of information and which value relates to which function or component of the vehicle. It is not only time consuming but also confusing.

BRIEF DESCRIPTION OF THE DRAWINGS

The invention claimed and/or described herein is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 1(*b*) depicts an exemplary structure of a vehicle model, according to an embodiment of the present teaching;

FIG. 1(*c*) shows exemplary types of models for a vehicle or components thereof, according to an embodiment of the present teaching;

FIG. 3(*b*) illustrates exemplary types of presentation modes in which information related to a vehicle part is presented, according to an embodiment of the present teaching;

FIG. 3(*c*) shows an exemplary presentation of vehicle information in a highlight presentation mode, according to an embodiment of the present teaching;

FIG. 3(*d*) shows an exemplary presentation in a parameter-based presentation mode, according to an embodiment of the present teaching;

FIG. 4(*b*) shows an exemplary presentation of information associated with a vehicle part where the presentation perspective for the vehicle model is chosen so that the visibility of components of the vehicle part is maximized, according to an embodiment of the present teaching;

SUMMARY OF THE DISCLOSURE

A system and method for presenting vehicle information, in which information associated with a functional part of a vehicle is received, a model for the vehicle is retrieved and a mode of operation based on the functional part and the model for the vehicle is determined. The information in the mode of operation is determined so that a portion of the presented model corresponding to the functional part may be visible and the information may be presented with respect to the visible functional part of the presented model.

DETAILED DESCRIPTION

Figure 1:
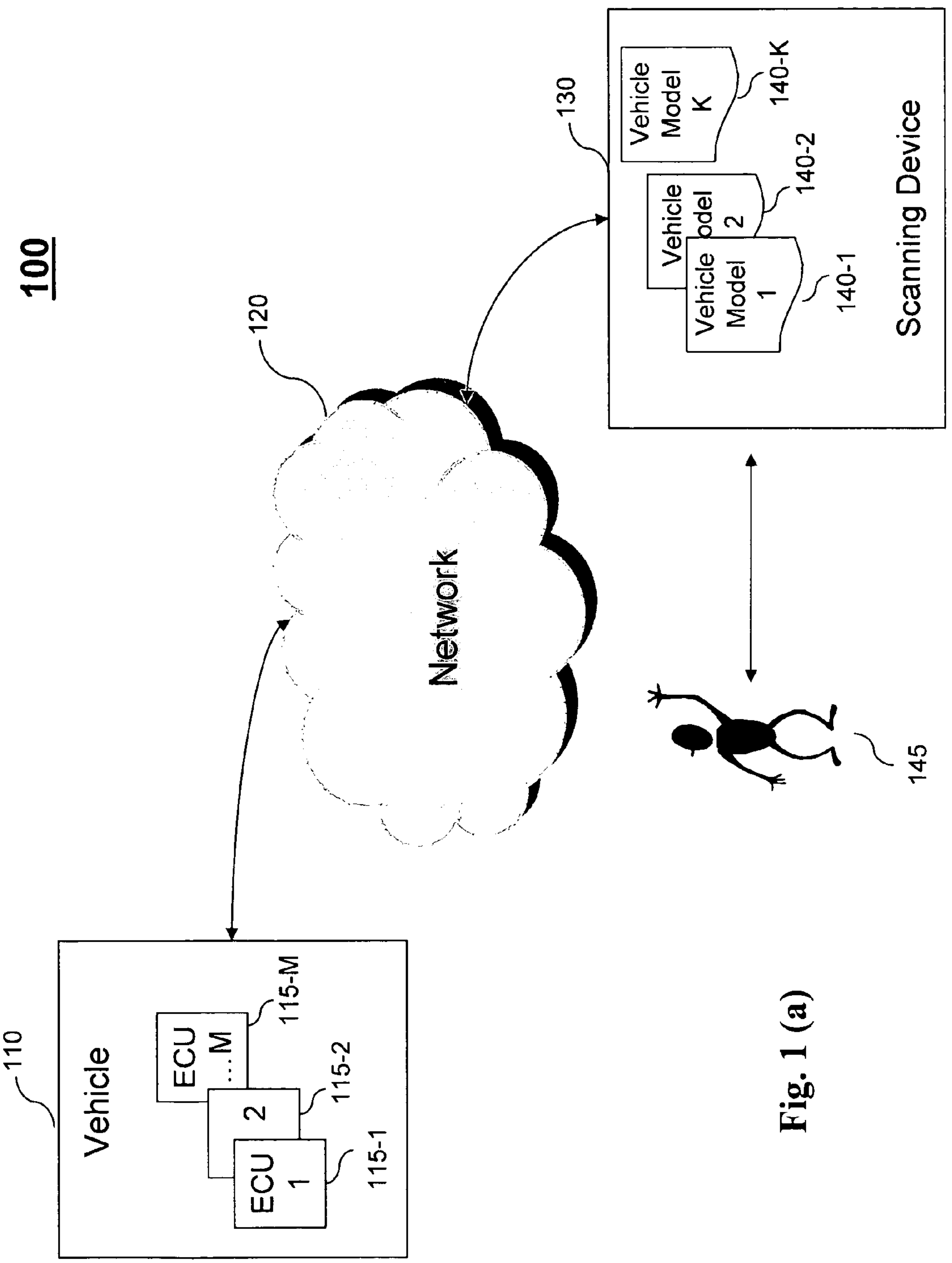
FIG. 1(*a*) depicts an exemplary diagram of a system in which a scanning device having at least one vehicle model stored therein interacts with a vehicle to obtain information, according to an embodiment of the present teaching.
Figure 1B:
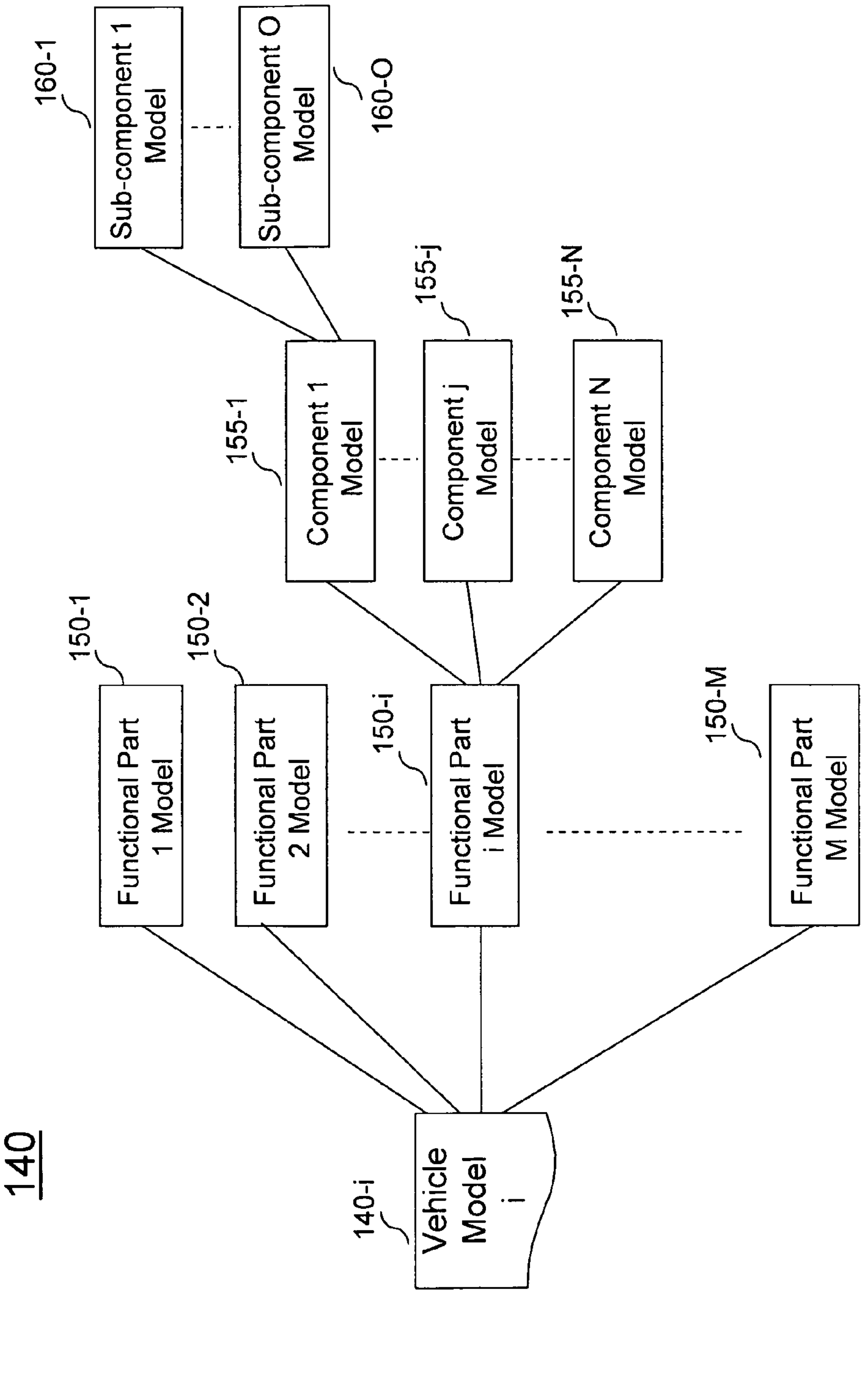
Figure 1C:
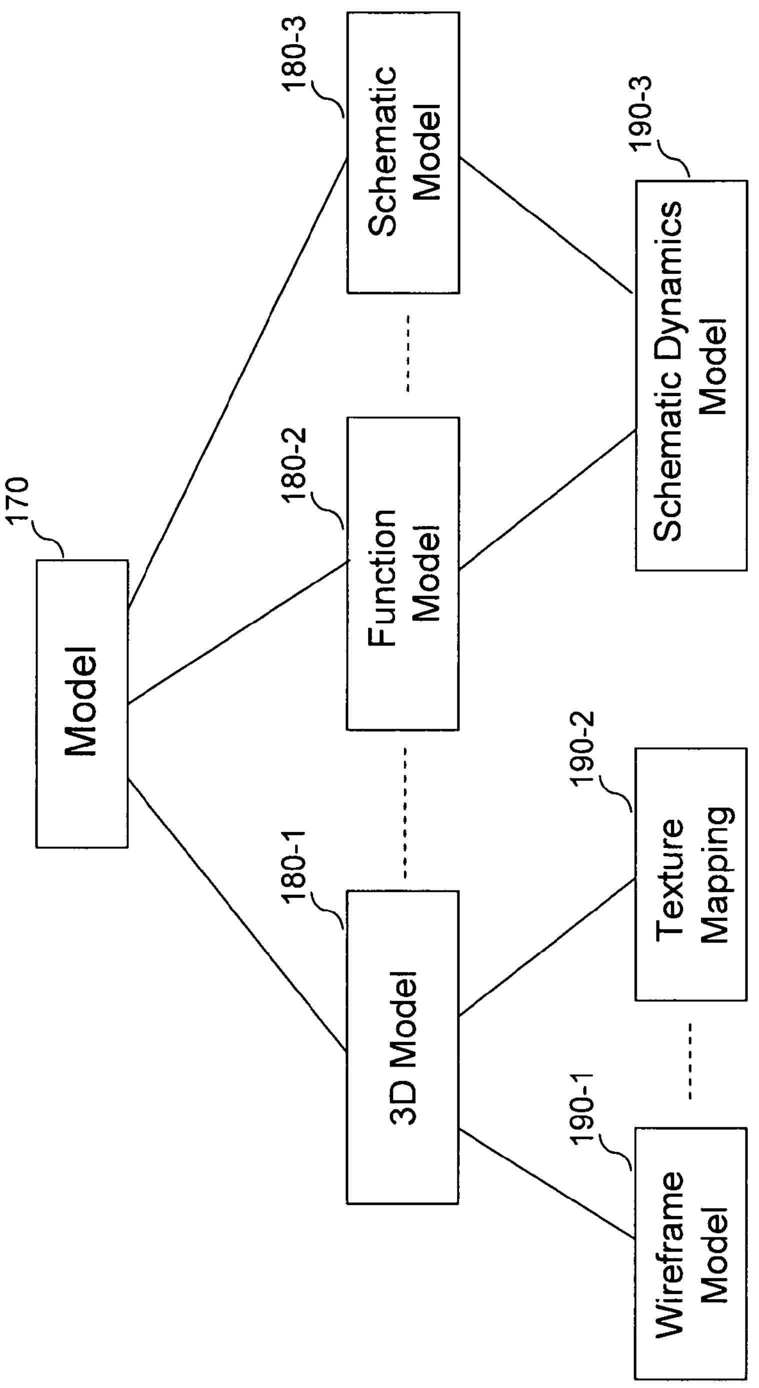

FIG. 1 depicts an exemplary diagram of a system 100 in which a scanning device 130 having at least one vehicle model stored therein interacts with a vehicle 110 to obtain and present information, according to an embodiment of the present teaching. In the exemplary system 100, the scanning device 130 stores K vehicle models 140-1, 140-2, . . . , 140-*k*, corresponding to different types of vehicles. In some embodiments, the scanning device 130 is an external device, including a computer, a laptop, a hand held device, or any small devices such as a Palm Pilot and a cellular phone. In some embodiments, the scanning device 130 is internal to the vehicle 110. In some embodiments, the scanning device 130 may be an external device to vehicle 110 but an internal device to another vehicle.

The scanning device 130 may be deployed with network communication capabilities enabling the scanning device 130 to communicate with the vehicle 110 via a network 120. The network 120 may correspond to the Internet, a virtual private network, a wireless network, a local area network (LAN), a wide range network (WAN), a proprietary network, a public switched telephone network (PSTN), or any combination thereof. The communication between the scanning device 130 and the vehicle 110 may be conducted in accordance with a certain communication protocol such as wireless LAN protocol 802.11, that is appropriate for a setting in which the system 100 operates. When the scanning device 130 is an external scanning device, the network 120 is external to the vehicle 110. When the scanning device 130 is an internal device, the network 120 may be internal to the vehicle 110.

A vehicle model may be represented in different ways. FIG. 1(*b*) depicts an exemplary construct 140 of a vehicle model, according an embodiment of the present teaching. In this embodiment, vehicle model 140 is a hierarchical representation of a vehicle, in which an underlying vehicle comprises a plurality of first level of functional parts, each of which comprises one or more second level of components, each of which further comprises one or more third level of sub-components, etc.

Correspondingly, the underlying vehicle may be represented by a hierarchy of models at different levels of representation. A vehicle is represented by an overall model for the vehicle in connection with a plurality of models representing individual functional parts of the vehicle. For example, a vehicle (e.g., vehicle i) may be represented by a vehicle model 140-*i* which also points to a plurality of M functional part models, 150-1, 150-2, . . . , 150-*i*, . . . , and 150-M, representing individual functional parts of the vehicle. Similarly, each such functional part (e.g., functional part i) may be represented by a functional part i model 150-*i* which point to N component models (e.g., component model 1 155-1, . . . , component model j 155-*j*, . . . , component model N 155-N) representing individual components included in the functional part. A model for each of such components (e.g., component model 155-*j*) may point to various sub-component models (e.g., 160-1, . . . , 160-0) representing individual sub-components contained in the component j.

Each of the models in the hierarchical vehicle model may be constructed using different approaches. FIG. 1(*c*) provides exemplary mode forms, according to an embodiment of the present teaching. Depending on the underlying object to be modeled, different model forms may be adopted. For instance, an overall vehicle may be modeled using a 3D CAD (Computer Aided Design) model. On the other hand, the stereo in a car may be represented by the circuitry drawing of the internal electronics instead of 3D CAD model. As shown in FIG. 1(*c*), a model 170 may correspond to a 3D model 180-1, a function model 180-2, . . . , or a schematic model 180-3. A 3D model may model an underlying object based on the geometric and physical features of the object. A function model may model an underlying object based on designated functionalities of the object. A schematic model may model an underlying object based on conceptual design of the object, which can be circuitry design, mechanical design, or mathematical design.

A 3D model may include a 3D CAD model 190-1, a 3D range model with texture mapping 190-2, or any other form of 3D models (not shown). Different types of vehicles usually have distinct 3D models. For example, a Chrysler car has a different model compared with a model for a GM car. Similarly, a model for a Taurus sedan made by Ford may be different from that for a Jaguar which is also made by Ford. Such a model may be used to visualize a vehicle. If a model is three dimensional, the model may be manipulated with respect to any viewing perspective. For example, in order to display a car model with a driver's door part visible from a front view, the model may be rotated and/or tilted so that the driver's door can be seen from the front view.

Some object in a vehicle may be represented using modeling techniques other than 3D geometric modeling. For example, the GPS component of a car may be represented based on its designated function (function model) or its circuit design (schematic model). Depending on specific needs, an object in a vehicle may be modeled based on application needs. In certain circumstances, an object may be modeled using more than one models or a representation created based on more than one modeling techniques. As illustrated, a function model may be combined with a schematic model to create a schematic dynamics model 190-3. For example, a circuit design (schematic model) may be visualized using dynamic operational information such as voltages and current flowing through different paths in the circuit (function model).

The vehicle 110 may correspond to an automotive such as a car, a truck, a boat, or a motorcycle. Such a vehicle may have internal parts that can be configured to not only interact with each other but also communicate with an outside device such as the scanning device 130. The vehicle 110 may internally have one or more electronic control units (ECUs), e.g., ECU 1 115-1, ECU 2 115-2, . . . , ECU M 115-M, that can be activated to communicate with various functional parts of the vehicle, e.g., for the purposes of acquiring information or controlling the operational status thereof. The vehicle 110 may also provide a communication interface to interact with the outside world (not shown).

The scanning device 130 may be deployed with one or more applications (not shown) running thereon that perform various functionalities described herein. The applications running on the scanning device 130 may be launched by an operator 145 of the scanning device 130. The scanning device 130 may also be configured to activate such applications automatically whenever the scanning device 130 is powered. In operation, such application(s) may be invoked to obtain information associated with one or more functional parts of vehicle 110 and to present such obtained information in appropriate forms. For example, the scanning device 130 may inquire operational status of the engine of the vehicle for, e.g., diagnosis purposes. Upon receiving such information from the vehicle 110, the scanning device 130 may present such information in a manner as described herein.

According to some embodiments of the present teaching, the scanning device 130 is configured to present information received from vehicle 110 in connection with a presentation of a model corresponding to vehicle 110. More specifically, the scanning device 130 may retrieve a stored model corresponding to vehicle 110 and then present both the retrieved model and the received information in such a way that the spatial arrangement of the information and the model and the spatial relationship thereof make it visually clear as to which part of the presented information is related to which part of the vehicle.

Figure 2:
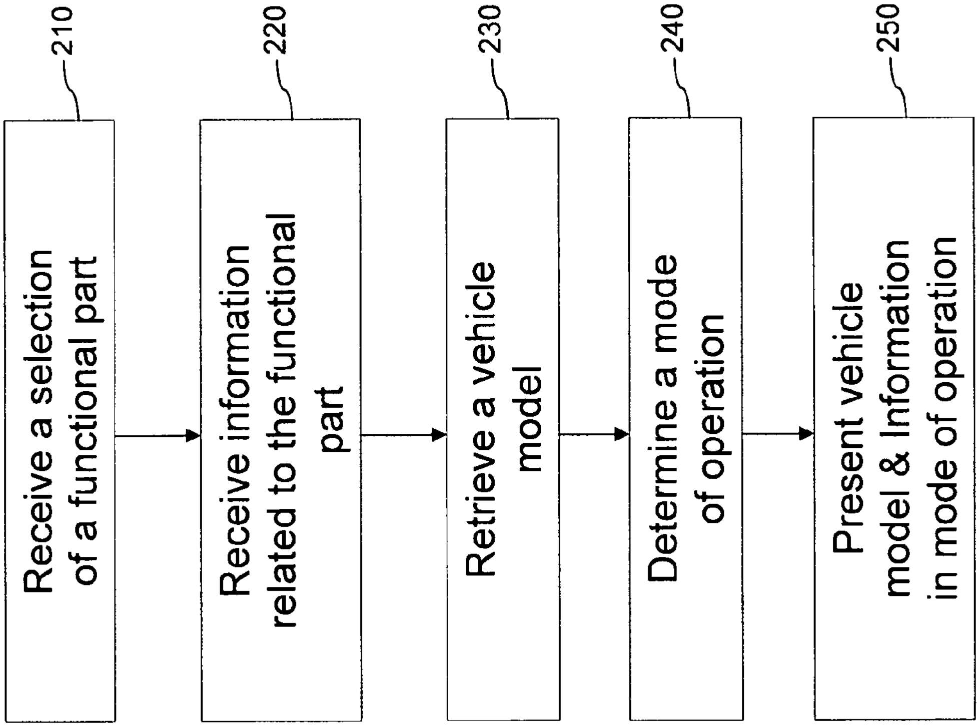
FIG. 2 is a flowchart of an exemplary process, in which a scanning device having at least one vehicle model stored therein obtains and presents information related to a vehicle, according to an embodiment of the present teaching.
Figure 3A:
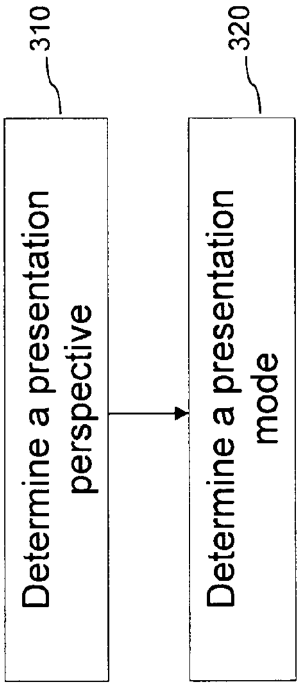
FIG. 3(*a*) is a flowchart of an exemplary process, in which a scanning device determines a mode of operation based on a selected functional part of a vehicle and a model thereof, according to an embodiment of the present teaching.
Figure 3B:
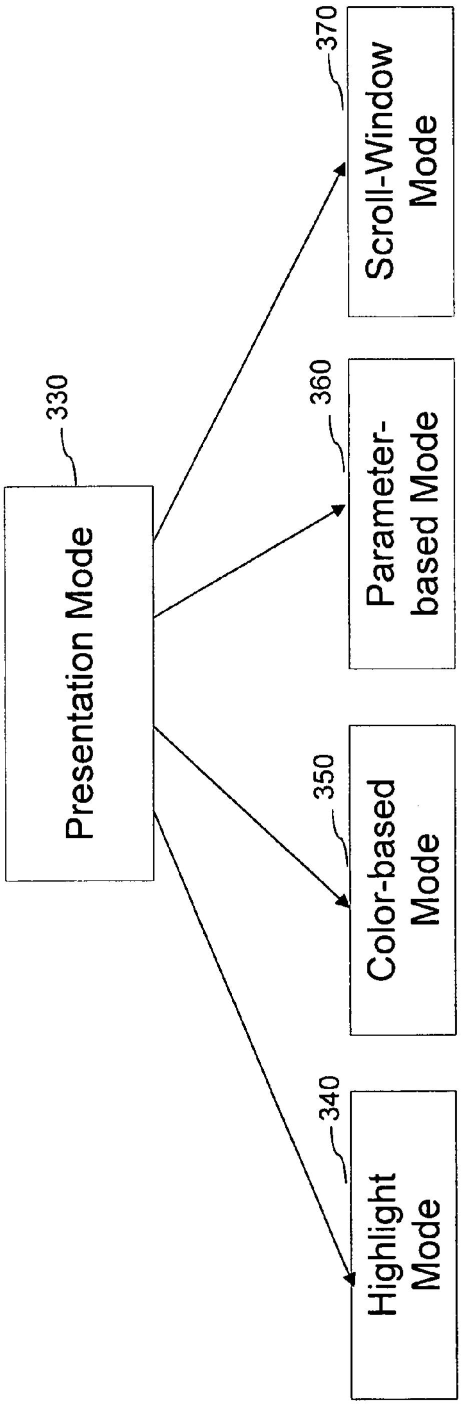
Figure 3C:
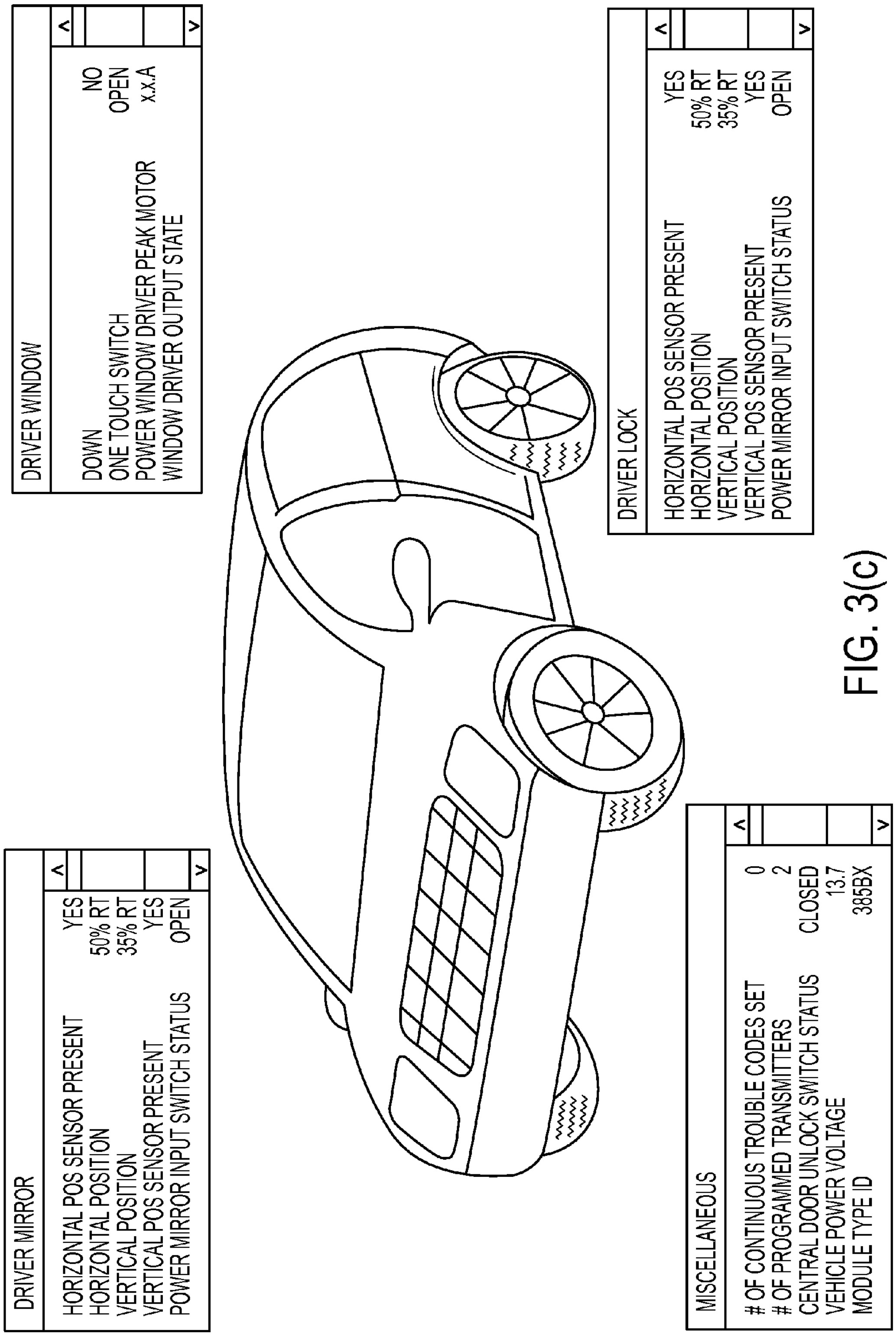
Figure 3D:
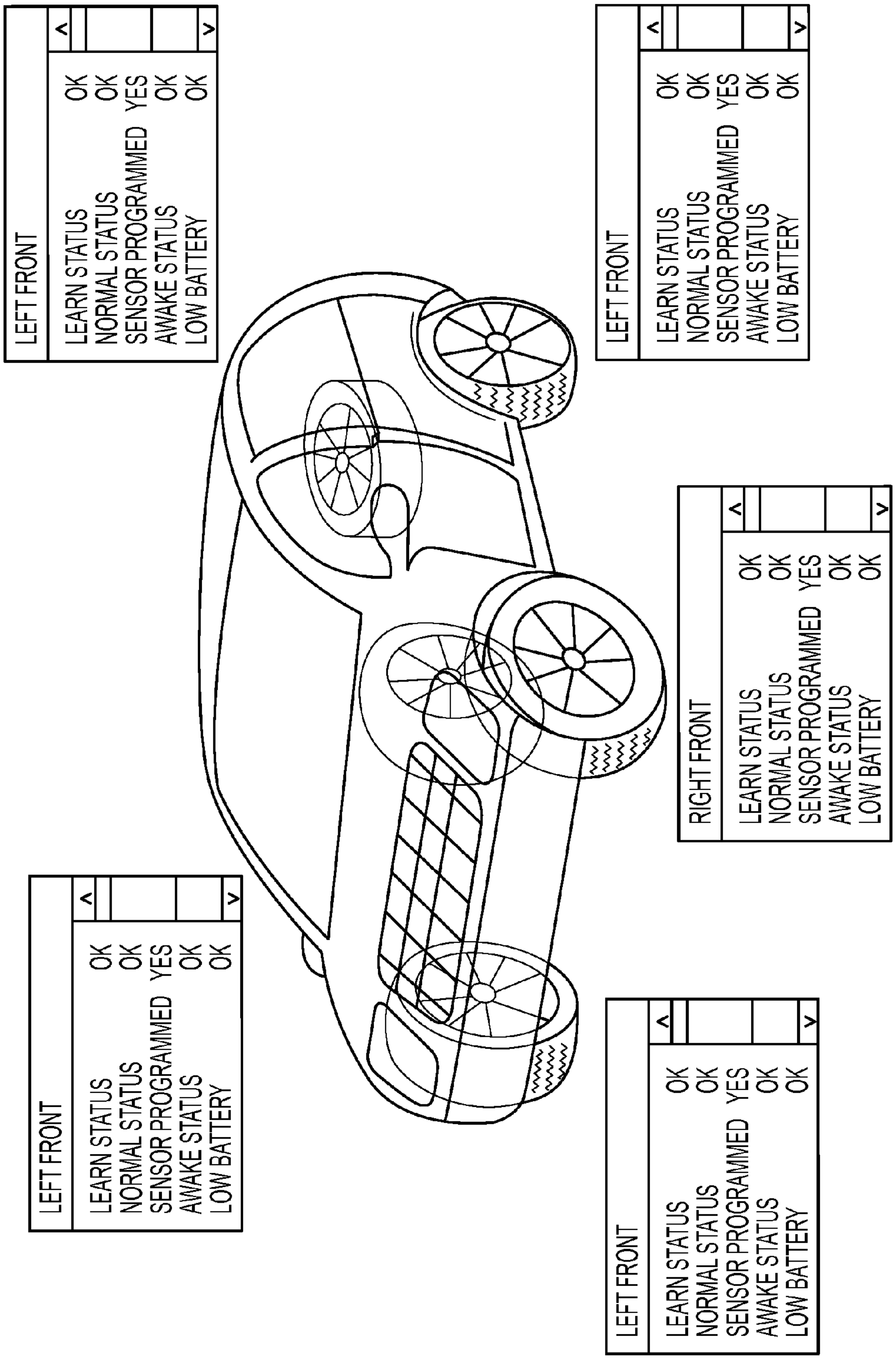

FIG. 2 is a flowchart of an exemplary process, in which the scanning device 130 having at least one vehicle model stored therein obtains and presents information of a vehicle, according to an embodiment of the present teaching. The scanning device 130 first receives, at 210, a signal indicating a selection of a functional part of vehicle 110. For example, a functional part selected in a car may be an engine of the car, a powered door of the car, the tail lights of the car, or the stereo system of the car. Such a selection may be made by operator 145 of the scanning device. The selection may also be made automatically by a diagnosis application running on the scanning device. In addition, although it is illustrated to select a functional part of vehicle 110, the selection may also be made on any component or sub-component of a functional part. In some embodiment, the selection of a vehicle part to be examined, inspected, or diagnosed may be performed hierarchically. For example, to select a light sensing part in a front left headlight, the functional part "headlights" may be selected first and then its component "front left headlight" may be selected which may then leads to the selection of a sub-component "light sensing part" contained therein.

Subsequent to a functional part being selected, the scanning device receives, at 220, information associated with the selected functional part from the vehicle. Prior to presenting such received information, the scanning device retrieves, at 230, a model corresponding to vehicle 110. Such a model may be pre-stored in a storage or database or may be dynamically downloaded to the scanning device 130. Although illustrated is a model retrieved for a functional part, in some embodiments, the model retrieved corresponds to any vehicle part selected, which may be a functional part, a component, or a sub-component. Based on the selected functional part as well as the model for the vehicle, a mode of operation is determined at 240. The received information and the model are then presented, at 250, according to the determined mode of operation.

The scanning device 130 may have a display screen on which both a vehicle model and the information received from the vehicle may be presented. The scanning device may also connect to an external display screen through, e.g., standard connections. When a vehicle model is presented, in addition to a chosen perspective, the presentation may also be made in different modes. For example, certain portion(s) of a model being displayed may be highlighted so that the highlighted portion becomes more visible. In other modes, certain portions of a displayed model may be presented in a transparent mode so that other content such as textual information may be superimposed thereon.

FIG. 3(*a*) is a flowchart of an exemplary process, in which the scanning device 130 determines a mode of operation based on a selected functional part of a vehicle and a model thereof, according to an embodiment of the present teaching. Given a selected functional part of the vehicle and a model thereof, the scanning device first determines, at 310, an appropriate perspective in which the model is to be presented. Such a presentation perspective may be selected to achieve some desired effect. For example, a desired effect may be to make a selected functional part visible from a chosen viewing angle. That is, the decision as to a presentation perspective may be made based on a selection of a functional part. For instance, if tail lights of a car are chosen as the functional parts to be examined in a diagnosis procedure, the presentation perspective may be determined accordingly so that when an underlying model is displayed, the chosen perspective is such that the tail lights of the car will be visible from the front view. In some embodiments, the determination of the perspective may also depend on the model retrieved. For example, if a model is a schematics of a circuitry, the model may correspond to a two-dimensional drawing so that the perspective choices may relate to only in what orientation the model is presented.

Once the presentation perspective is determined (at 310), the scanning device may further determine, at 320, a presentation mode in which both the underlying model and the information received from the vehicle are to be presented. There may be a plurality of presentation modes available and any specific mode may be chosen based on a variety of considerations. FIG. 3(*b*) illustrates exemplary types of presentation modes 330 in which information related to a functional part of a vehicle is presented, according to an embodiment of the present teaching. A presentation mode may include a highlight mode 340, a color-based presentation mode 350, a parameter-based presentation mode 360, and a scroll mode 370.

In a highlight mode, a selected functional part may be highlighted compared with other part presented. FIG. 3(*c*) shows an exemplary presentation of a car model in a highlight presentation mode, according to an embodiment of the present teaching. In this illustration, a driver's door is chosen as a functional part. The presentation of the car model is made according to a perspective in which the driver's door or the selected functional part is visible. In addition, the selected functional part (the driver's door) is displayed in a highlight presentation mode so that the entire driver's door is highlighted compared with other parts of the vehicle. Similarly, the highlighted portion corresponding to a selected functional part may also be displayed using a specific color in a color-based presentation mode (350). For example, if the engine of a car is selected, the engine, when presented, may be painted using different grades of red color to indicate its temperature.

In parameter-based mode 360, the way a functional part is presented depends on specific operational status of the selected functional part. For example, if the headlights of a car are chosen as the functional part being examined, the selected headlights may be presented according to the operational status of the headlights. For instance, if the operational status of the headlights include ON and OFF combined with the possibilities of low beam and high beam light, there are four combinations with regard to operational status of the headlights. In this case, different presentation mode(s) may be chosen so that each of the combinations yields a different setting. For example, for the two combinations having an OFF status, there may be a first level of brightness in displaying the headlights. In a combination of ON and low beam light, there may be a second level of brightness in displaying the headlights. In a combination of ON and high beam light, there may be highest level of brightness in displaying the headlights. FIG. 3(*d*) shows an exemplary presentation of headlights in a parameter-based presentation mode, according to an embodiment of the present teaching.

The determination of the presentation mode may also depend on the type of model retrieved. In some embodiments, the retrieved model may not be a 3D or physical appearance based model. For example, a function model (i.e., 180-2 in FIG. 1(*c*)) for a gas tank (vehicle part) may represent the gas tank using a gauge (instead of the physical appearance of the tank). With respect to such a model, a highlight mode may not be available. A parameter-based presentation mode may be selected in which an estimated amount of gas in the tank may be shown by indicating the level on the gauge. As another example, a schematic model for a circuit board may be displayed in a 2D plane as a choice of perspective. Different presentation modes may be determined to show on which paths a current is detected.

The scroll mode 370 may be applicable to any information that may be presented as a list. In some embodiments of the present teaching, information related to a selected functional part and acquired from vehicle 110 is presented at locations nearby the presented functional part of an underlying model. This is illustrated in FIG. 3(*c*) where information related to a driver's door and acquired from vehicle 110 is displayed nearby the highlighted driver's door. This is also shown in FIG. 3(*d*) where information related to headlights received from vehicle 110 is presented at locations nearby the headlights of the presented vehicle model. In both FIG. 3(*c*) and FIG. 3(*d*), the received information is presented in exemplary pop-up windows, each of which has a scroll bar on the right side of the window to allow a user to scroll up and down to view different parts of the information list contained therein.

Each of the presentation modes may be chosen alone or in combination with other presentation mode(s). In some embodiments, more than one presentation mode may be simultaneously selected and applied as a combination. For example, for a selected engine, both a highlight mode and a parameter-based mode may be applied so that the engine is presented as a highlighted with a grade of red representing the level of temperature of the engine.

Figure 4A:
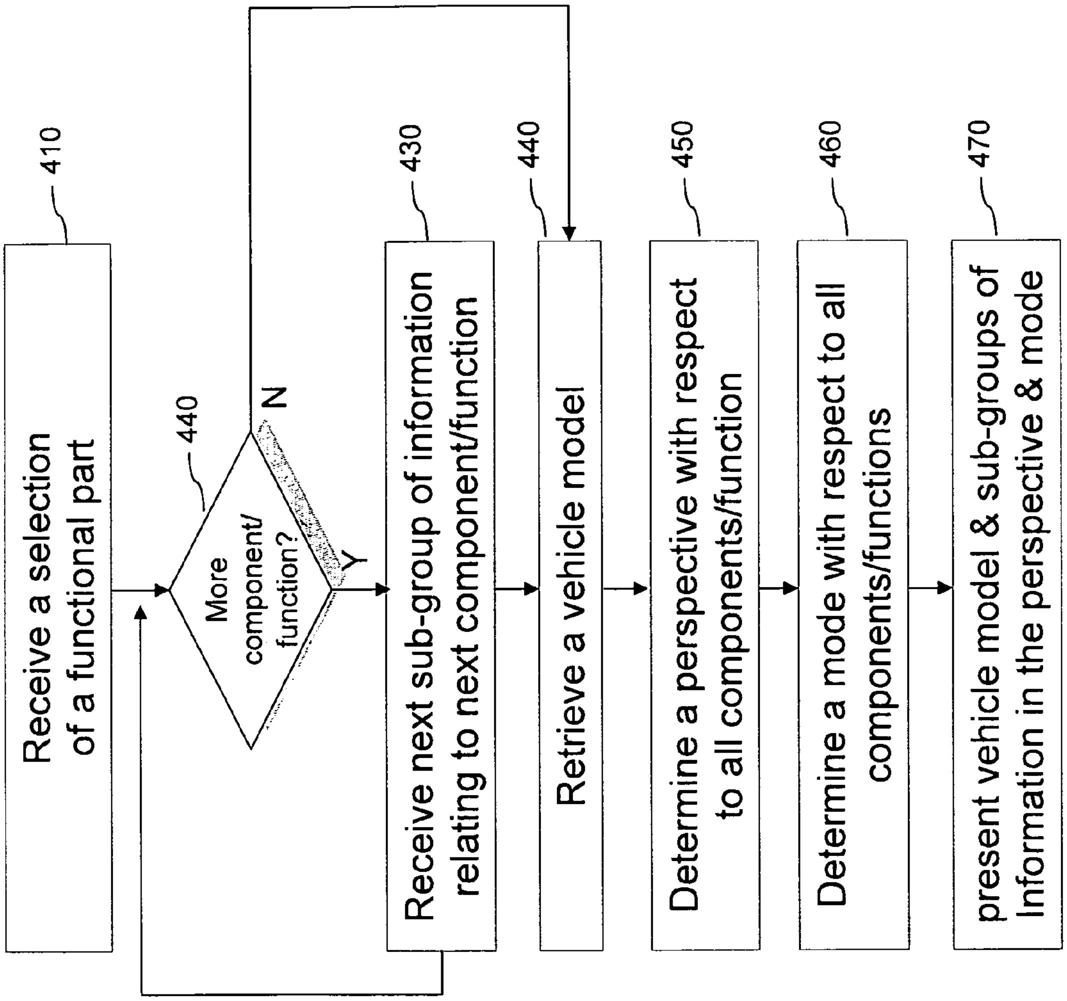
FIG. 4(*a*) is a flowchart of an exemplary process, in which a scanning device divides information related to a selected functional part of the vehicle into sub-groups based on components and presents such information at corresponding component locations, according to a different embodiment of the present teaching.
Figure 4B:
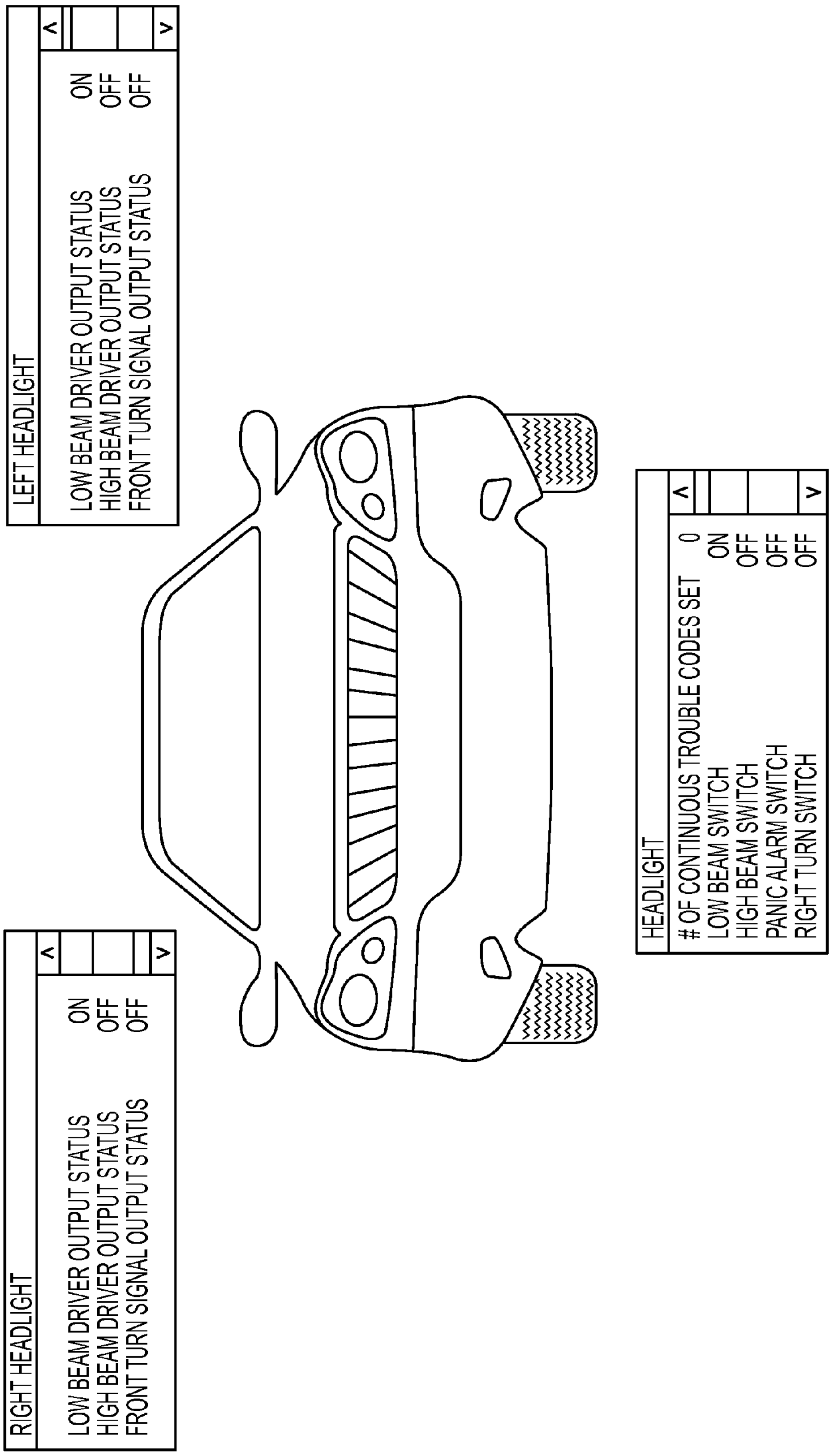

In some embodiments, information related to a selected functional part may be split into different sub-groups of information, each of which may be related to a component or a sub-function of the selected functional part. Information in each sub-group may be presented nearby the component to which the sub-group is related. FIG. 4(*a*) is a flowchart of an exemplary process, in which the scanning device 130 splits information related to a selected functional part of the vehicle into sub-groups and presents such information at different locations, according to a different embodiment of the present teaching. The scanning device 130 receives, at 410, a selection of a functional part related to vehicle 110. For each of the components included in the selected functional part, the scanning device 130 requests and receives, at 430, information related to that component from the vehicle 110. This data acquisition process continues, determined at 420, until information for all components in the selected functional part has been acquired. An underlying vehicle model is retrieved at 440 and a presentation perspective for presenting the vehicle model is determined at 450. As there are multiple components, the presentation perspective is chosen to maximize the visibility of all components included in the selected functional part. FIG. 4(*b*) shows an exemplary presentation of a functional part (wheels) of a vehicle where the presentation perspective for the model is chosen so that the visibility of all five components is maximized, according to an embodiment of the present teaching. In this illustration, the vehicle model is displayed in such a manner that all five wheels are visible.

The presentation mode may also be determined at 460. The presentation mode may be determined with respect to each component of the functional part or information within each of the sub-groups. This is illustrated in FIG. 4(*b*), where each of the wheels is displayed in a highlight mode and other parts of the vehicle are displayed in a transparent mode. The information acquired from five different wheels is divided into five sub-groups, each of which corresponds to one wheel (or tire). In determining the presentation mode for each sub-group, the scanning device 130 may consider different factors to determine how to present information associated with each component. For instance, based on a chosen presentation location, where each of the wheels is presented, the availability of nearby regions for displaying information associated with each component may be computed so that an appropriate presentation mode for such information may be further determined. For example, size of each window, whether to apply a scrollable window, font size, etc. may be determined according to the availability of the nearby regions. This is illustrated in FIG. 4(*b*), where the presentation location for each of the wheels may be used to determine where to display the information in each sub-group associated with each wheel. As shown, there are five sub-groups of information. Each sub-group is related to an individual wheel and is displayed at a location nearby the corresponding wheel in a scrollable window. Information associated with the left front wheel is displayed in a window marked as "Left Front" at a location close to the visual presentation of the left front wheel. Information associated with the right front wheel is displayed in a window marked as "Right Front" at a location close to the visual presentation of the right front wheel. Information associated with the right rear wheel is displayed in a window marked as "Right Rear" at a location close to the visual presentation of the right rear wheel. Information associated with the left rear wheel is displayed in a window marked as "Left Rear" at a location close to the visual presentation of the left rear wheel. Information associated with the spare wheel is displayed in a window marked as "Spare" at a location close to the visual presentation of the spare wheel.

In FIG. 4(*b*), all other parts of the vehicle except the wheels are presented in a transparent mode, which may be so chosen that information in some of the sub-groups may be displayed by superimposing (e.g., "Left Rear" and "Spare" sub-groups) on the presented vehicle model. Although in some instances, a group of components may be selected as an integral functional part (e.g., all five wheels belong to the same functional part "wheels"), each component may also be chosen as an independent individual functional part. For example, a left front wheel may itself be a target for inspection or diagnosis. In this case, the left front wheel may be selected as a functional part of the underlying vehicle.

Information related to a functional part may also be grouped into sub-groups according to distinct functions. For example, the spare tire as shown in FIG. 4(*b*) may be considered as having a different functional role when compared with other wheels. This is also partially illustrated in FIG. 3(*c*), where a driver's door has different components and can perform different functions. For example, a driver's door may have different components such as a door panel, a powered window, a mirror, and a lock. The driver's door may also have different functions such as application of codes, voltage transmission, and encoding/decoding capabilities. As shown in FIG. 3(*c*), information is divided into sub-groups based on both components (e.g., window, lock, an mirror) and/or functions (codes, voltage, etc.).

Figure 5:
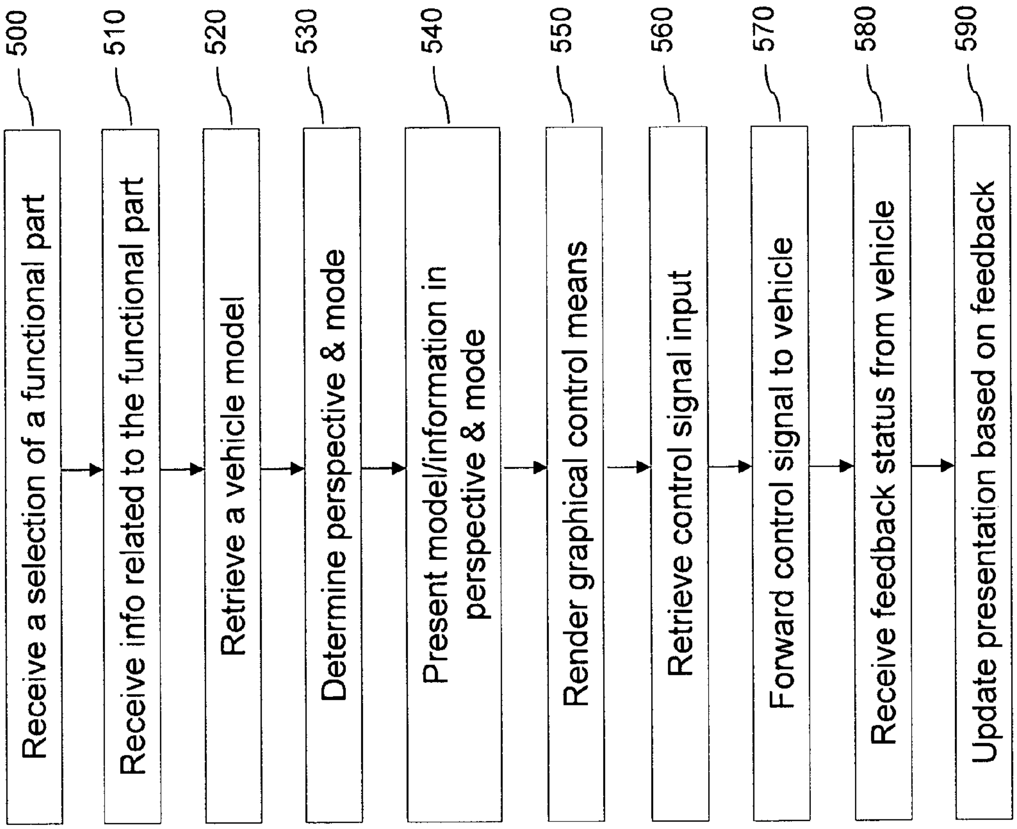
FIG. 5 is a flowchart of an exemplary process according to another embodiment of the present teaching.

As discussed above, in some embodiments of the present teaching, a presentation mode may also be parameter based. That is, the presentation of a vehicle model and/or information associated with a selected functional part of the model may be displayed according to some operational status of some functional part characterized by certain parameters. For example, the headlights of a vehicle model may be presented based on whether the low beam or high beam lights are on or off. In some embodiments, such operational status may be controlled via the scanning device 130 by changing associated control parameters using graphical control means. A change made through such graphical control means may be reflected dynamically in the presentation. FIG. 5 is a flowchart of an exemplary process according to a different embodiment of the present teaching, in which the scanning device 130 may present one or more graphic based control means through which a user may modify one or more control parameters of a selected functional part or a component thereof to accordingly change the operational status of such part(s).

The scanning device 130 first receives, at 500, a signal indicative of a selection of a functional part of a vehicle. The scanning device 130 then requests and receives, at 510 from the vehicle 110, information associated with the selected functional part. A vehicle model corresponding to vehicle 110 is then retrieved at 520. A presentation perspective and a presentation mode are then determined, at 530, based on the selection of the functional part and the model retrieved. Such determined presentation perspective and mode are then used to present, at 540, the vehicle model in connection with the information received in accordance with the methods described herein. To facilitate graphic based control over the selected functional part (or components thereof), the scanning device 130 renders, at 550, one or more graphical control means on a presentation medium where the vehicle model and the information related to the selected functional part is presented. Upon receiving, at 560, a control signal via the graphical control means, the scanning device 130 may then forward this control signal to the vehicle, at 570. The scanning device 130 may also subsequently acquire, at 580, a feedback operational status signal resulted due to the control signal from the vehicle. When there is a status change resulted from the control signal, the change is dynamically updated, at 590, in the presentation by adjusting the presentation based on the feedback status signal.

Figure 6:
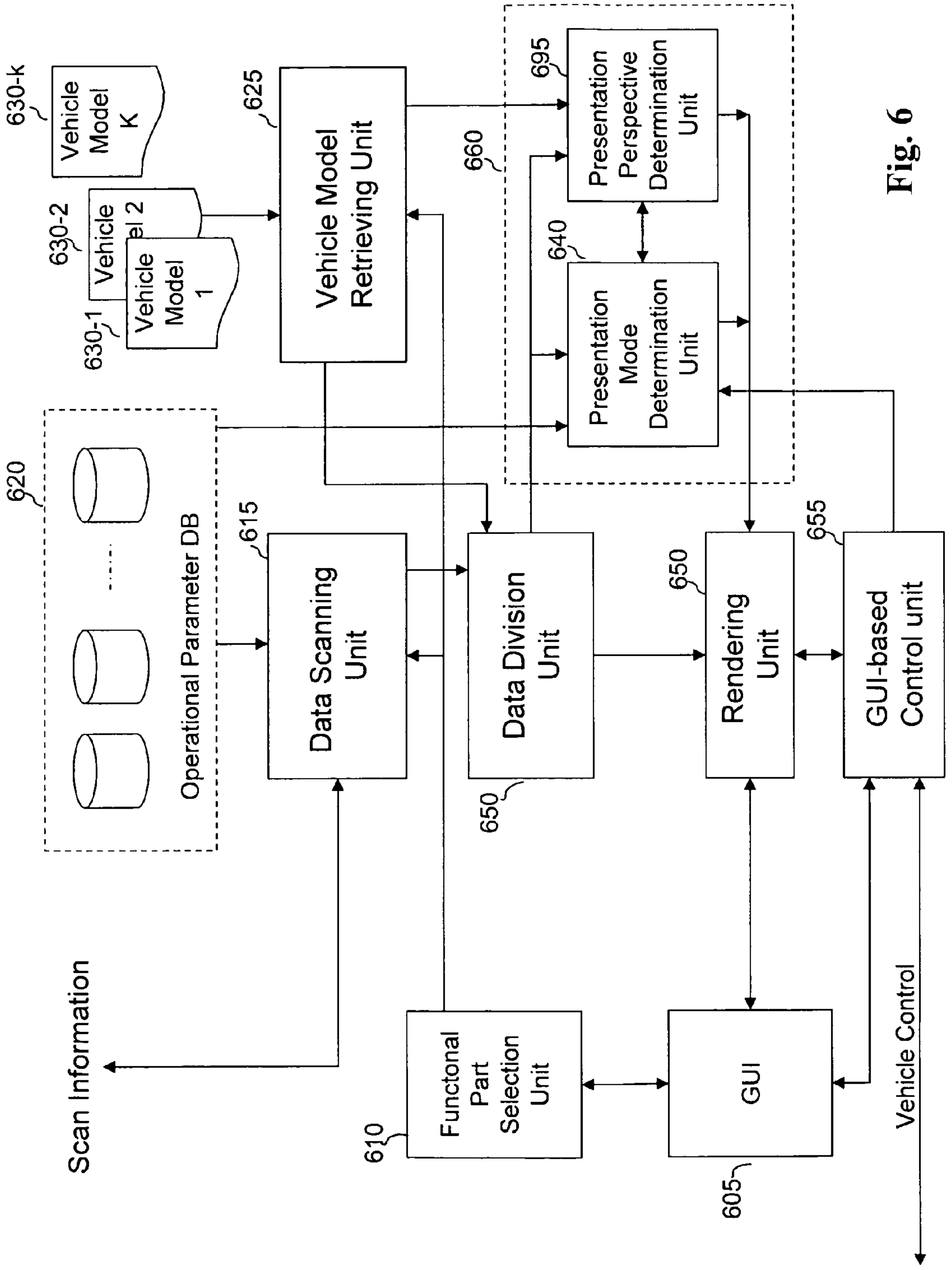
FIG. 6 depicts an exemplary internal structure of a scanning device, according to an embodiment of the present teaching.

FIG. 6 depicts an exemplary internal structure 600 of the scanning device 130, according to an embodiment of the present teaching. In this exemplary structure, the scanning device 130 comprises a graphical user interface (GUI) 605, a functional part selection unit 610, a data scanning unit 615, a vehicle model retrieving unit 625, a data division unit 635, a mode determination unit 660, and a rendering unit 650. Through GUI 605, the functional part selection unit 610 may interact with an operator (e.g., 145) to select a functional part of a vehicle to be inspected, examined, or diagnosed. Such a selection is forwarded to the data scanning unit 615, which may then communicate with the vehicle to request and obtain information associated with the selected functional part. The functional part may also be selected by other means, e.g., by a diagnosis application running on the scanning device 130.

The data scanning unit 615 may determine what types of information to be acquired from the vehicle based on knowledge about parameters known to be related to the selected functional part, which may be stored, e.g., in an operational parameter database 620. When the data scanning unit receives requested information from the vehicle, it may forward such information to data division unit 635, where the received information may be organized into sub-groups, each of which may correspond to an individual component or a distinct sub-function of the selected functional part.

The selection of the functional part may also be forwarded to vehicle model retrieving unit 625 that retrieves a corresponding vehicle model from a collection of vehicle models 630-1, 630-2, . . . , 630-K. Information relating to the retrieved vehicle model may also be forwarded to the data division unit 635 to assist a determination as to how the information related to the selected functional part is to be divided. For example, different vehicles may include different number of components for a same functional part.

To present the retrieved vehicle model having the selected functional part and the information related to the functional part, the mode determination unit 660 is invoked. The mode determination unit 660 comprises a presentation perspective determination unit 645 and a presentation mode determination unit 640. The presentation perspective determination unit 645 selects a perspective in which the retrieved vehicle model is to be presented. Such a perspective may be determined to maximize the visibility of all components included in the selected functional part. Such a determination may be made based on both the composition of the retrieved vehicle model (e.g., how many components included therein) as well as how the information is divided (e.g., sub-groups of information).

The presentation mode determination unit 640 selects one or more presentation modes in which the retrieved vehicle model and/or the received information associated with the selected functional part are/is to be presented, as discussed herein. A decision about a presentation mode may be made aiming at optimizing the visual effect as to the clarity of the nature of the information presented. A determination may be made by considering various factors. For example, a presentation mode may be affected by a perspective used to present the vehicle model (e.g., input from the presentation perspective determination unit 645), how the sub-groups are divided (e.g., input from the data division unit 635), and possible status for each parameter in each sub-group (e.g., input from the operational parameter database 620).

The determined presentation perspective (from 645) and presentation mode (from 640) may then be forwarded to the rendering unit 650, e.g., together with the sub-groups of information from the data division unit 635. Based on these input information, the rendering unit 650 may then present the vehicle model and the sub-groups of information related to the selected functional part of the vehicle based on the determined presentation perspective and presentation mode. The presentation may be made via the GUI 605, which may include an internal display screen or connected to an external presentation medium (not shown).

Optionally, the system 600 may also include a GUI based control unit 655, through which a user of the scanning device 130 may control the vehicle 110 via graphical means. The GUI based control unit 655 may render one or more graphical control means on a display medium, which may be same as the presentation medium for vehicle related information or a separate medium. Through this display medium, a user can interact with the graphical control means to control the operational parameters or status. A graphical control means may be implemented as a toggle button, through which a user may switch from one status to another by clicking on the button. A graphical means may also be implemented as a pull-down menu popped up when a user, e.g., right clicks on a parameter presented as part of the information related to the selected functional part. To indicate that a particular parameter can be controlled, the GUI based control unit may implement a scheme, e.g., to make the controllable parameter flickering, highlighted, or in a certain color.

Upon receiving a control signal from a user, the GUI based control unit 655 may send the received control signal to one or more appropriate ECUs of the vehicle. It may also subsequently request a feedback signal that indicates the status after the control signal takes effect. Upon receiving the feedback signal, the GUI based control unit 655 may then proceed to dynamically update the presented information. The GUI based control unit may forward the received feedback signal to the presentation mode determination unit 640 so that a decision may be made as to whether the presentation mode needs to be updated. The feedback signal indicating the current status of the underlying controllable parameter is also forwarded to the rendering unit 650, which then updates the presentation of the controllable parameter based on the changed status as well as the updated presentation mode.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

I claim:

1. A method for presenting vehicle information, comprising steps of:

coupling a scanning device to a vehicle;

receiving, at the scanning device, a selection of a functional part of the vehicle;

receiving, in response to the selection and at the scanning device, information associated with the functional part of the vehicle;

retrieving a model for the vehicle, the model being a three-dimensional (3D) model;

determining a particular viewing angle for presenting the 3D model on a display screen so as to increase visibility of the functional part on the display screen;

rotating the 3D model for the vehicle to present the 3D model at the particular viewing angle; and presenting the functional part and the information associated with the functional part such that the functional part and the information associated with the functional part are visible on the display screen when the 3D model for the vehicle is presented at the particular viewing angle.

2. The method according to claim 1, wherein the vehicle is an automobile.

3. The method according to claim 1, wherein presenting the functional part includes presenting the functional part differently compared to parts of the vehicle that are not selected as the functional part of the vehicle.

4. The method according to claim 3, wherein the functional part is presented using a different intensity than that used in presenting other parts of the vehicle.

5. The method according to claim 1, wherein the functional part is presented based on an operational status of the functional part.

6. The method according to claim 5, wherein the operational status of the functional part is presented using color.

7. The method according to claim 5, wherein the operational status of the functional part is controllable with respect to a control parameter of the function part.

8. The method according to claim 7, wherein the operational status of the functional part is adjustable via a graphical control.

9. The method according to claim 1, wherein the information associated with the functional part includes data scanned from the vehicle and comprises at least one of inspection data and diagnostic data.

10. The method according to claim 1, wherein the information associated with the functional part is split into at least one sub-group of information, each of which is presented separately.

11. The method according to claim 10, wherein information included in each sub-group is associated with a distinct component of the functional part and is presented nearby the component.

12. The method according to claim 10, wherein information included in each sub-group is associated with a distinct sub-function performed by the functional part.

13. The method according to claim 10, wherein the information in each sub-group is presented within a space.

14. The method according to claim 13, wherein a dimension of the space is determined based on availability of presentation space given the spatial relationship in the presentation space among different components of the functional part.

15. The method according to claim 13, wherein the information is presented in a scrollable window in the presentation space.

16. A method for presenting scanned vehicle information, comprising steps of:
- coupling a scanning device to a vehicle
- receiving, at the scanning device, a first signal indicative of a selection of a functional part of the vehicle;
- retrieving information associated with the functional part of the vehicle;
- retrieving a model for the vehicle, the model being a three-dimensional (3D) model;
- rotating the 3D model for the vehicle to present the 3D model on a display screen at a particular viewing angle that increases visibility of the functional part on the display screen; and
- presenting the functional part and the information associated with the functional part such that the functional part and the information associated with the functional part are visible on the display screen when the 3D model for the vehicle is presented at the particular viewing angle.

17. The method according to claim 16, wherein presenting the functional part includes presenting the functional part differently so that the functional part is visually distinct compared to parts of the vehicle that are not selected as the functional part of the vehicle.

18. The method according to claim 16, wherein the functional part is presented based on an operational status of the functional part.

19. The method according to claim 18, wherein the operational status of the functional part is controllable via a graphical control with respect to a control parameter of the function part.

20. The method according to claim 16, wherein the information associated with the functional part is split into at least one sub-group of information, each of which is presented separately.

21. The method according to claim 16, wherein the information associated with the functional part is presented in a scrollable window.

22. An apparatus for presenting vehicle information, comprising:
- a functional part selection unit configured to interact with a user to select a functional part of a vehicle to be inspected;
- a receiver configured to receive information associated with the functional part of the vehicle;
- a data storage configured to store a model for the vehicle, the model being a three-dimensional (3D) model;
- a mode determination unit configured to determine a particular viewing angle for presenting the 3D model on a display screen so as to increase visibility of the functional part on the display screen;

and
- a rendering unit configured to rotate the 3D model for the vehicle for presenting the 3D model at the particular viewing angle and to present the functional part and the information associated with the functional part such that the functional part and the information associated with the functional part are visible on the display when the 3D model for the vehicle is presented at the particular viewing angle.

23. The apparatus according to claim 22, wherein the functional part of the vehicle is presented differently so that the functional part is visually distinct compared to parts of the vehicle that are not selected as the functional part of the vehicle.

24. The apparatus according to claim 22, further comprising a graphical control unit configured to control an operational status of the functional part of the vehicle via a graphical unit.

25. The apparatus according to claim 22, further comprising a data division unit configured to split the information into one or more sub-groups of information, each of which is presented separately with respect to the functional part of the vehicle.

26. An apparatus for presenting vehicle information, comprising:
- a receiver configured to receive a selection of a functional part of a vehicle and to receive information associated with the functional part of a vehicle;
- a data storage configured to store a model for the vehicle, the model being a three-dimensional (3D) model;
- a rendering unit configured to rotate the 3D model for the vehicle such that the 3D model is presented on a display screen at a particular viewing angle that increases visibility of the functional part on the display screen and to present the functional part and the information associated with the functional part such that the functional part and the information associated with the functional part are visible on the display when the 3D model for the vehicle is presented at the particular viewing angle.

27. The apparatus according to claim 26, wherein the rendering unit presents the functional part of the model differently so that the functional part is visually distinct compared to parts of the vehicle that are not selected as the functional part of the vehicle.

28. The apparatus according to claim 26, further comprising a graphical control unit configured to control an operational status of the functional part of the vehicle via a graphical unit.

29. A system for presenting information in relation to a vehicle having at least one functional part contained therein, the system comprising;

a device configured to communicate with the vehicle to obtain and present information related to a functional part of the vehicle, wherein the device comprises:

a receiver configured to receive the information associated with the functional part of the vehicle, a data storage configured to store a model for the vehicle, the model being a three-dimensional (3D) model, and a rendering unit configured to rotate the 3D model for the vehicle such that the 3D model is presented on a display screen at a particular viewing angle that increases visibility of the functional part on the display screen and to present the functional part and the information associated with the functional part such that the functional part and the information associated with the functional part are visible on the display when the 3D model for the vehicle is presented at the particular viewing angle.

30. The system according to claim 29, wherein the device is configured to present the functional part of the vehicle differently so that the functional part is visually distinct compared to parts of the vehicle that are not selected as the functional part of the vehicle.

31. The system according to claim 29, wherein the device further comprises a graphical control unit configured to control an operational status of the functional part of the vehicle via a graphical unit.

* * * * *